Patented Nov. 18, 1924.

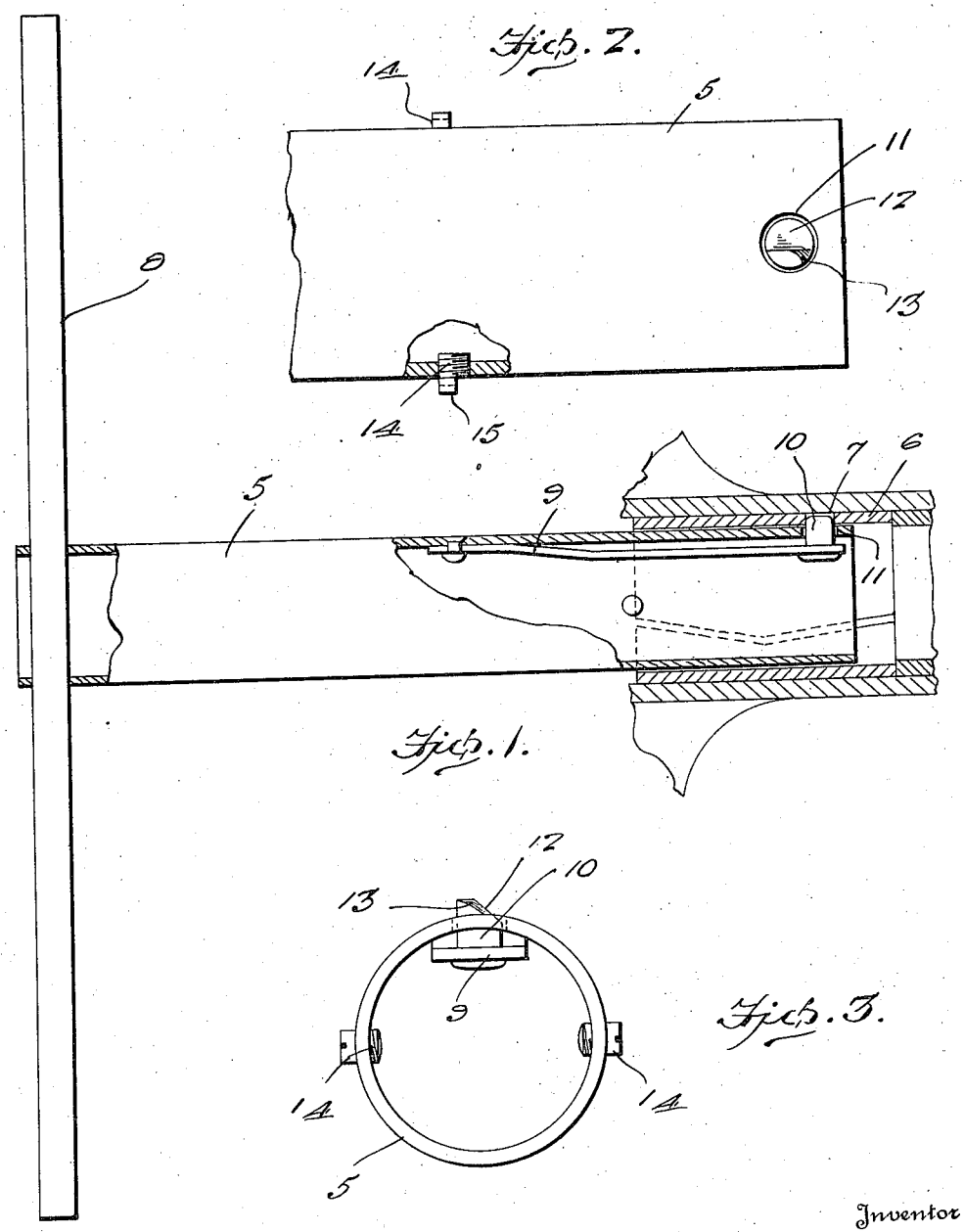

1,516,189

UNITED STATES PATENT OFFICE.

ALBERT JOSEPH HEBERT, OF FRANKLIN, NEW HAMPSHIRE

BEARING-SLEEVE REMOVER.

Application filed February 21, 1924. Serial No. 694,364.

*To all whom it may concern:*

Be it known that I, ALBERT JOSEPH HEBERT, a citizen of the United States, residing at Franklin, in the county of Merrimack and State of New Hampshire, have invented certain new and useful Improvements in Bearing-Sleeve Removers, of which the following is a specification.

This invention relates to the general art of hand operated tools, and has more particular reference to a tool wherein the rear axle bearing sleeves of Ford automobiles may be readily removed, which is at the present time a very difficult and laborious operation.

The primary object of the invention is to provide a tool of the above character that may be readily inserted into the rear axle sleeve of Ford automobiles and so manipulated as to remove the sleeve in a quick and easy manner.

An additional object is to provide a tool of the above character, that may be manufactured and marketed at a small cost in order to meet with all of the requirements for a successful commercial use.

An additional and pertinent object is to provide a tool that is a substantial improvement and simplification upon tools of this general character now employed for the purpose of removing bearing sleeves from the rear axles of Ford or other type automobiles.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views, Figure 1 is a view partly in side elevation and partly in cross section, of a bearing sleeve remover constructed in accordance with the present invention, the same being shown as actually in use, Figure 2 is an enlarged elevational view of one end of the tool partly in cross section, for more clearly disclosing the means for adjusting the limit of inward movement of the tool, with respect to the bearing sleeve for allowing the bearing sleeve engaging member constituting the essential part of the present invention to be readily positioned within the usual opening of the bearing sleeve, and Figure 3 is an end elevational view of the present tool.

Now having particular reference to the drawing, my novel rear axle bearing sleeve removing tool constitutes the provision of a relatively elongated metallic tube 5 open at its opposite end and being circular in cross section and of such a diameter as to readily fit within the rear axle bearing sleeve 6 of a Ford type automobile, and in this instance, it will probably be well to set forth the fact that these rear axle bearing sleeves are formed adjacent their inner ends with an opening 7.

At one end of this metal tube 5, the same is provided with registering openings upon diametrically opposite sides for permitting the attachment of a turning handle in the form of a relatively elongated rod 8 to said tube.

Secured at its inner end to a desired point upon the interior of said tube 5 is a relatively elongated leaf spring 9 that carries adjacent its forward end an outwardly extending pin 10 that has free passage through an opening 11 at the front end of said tube 5, it being obvious that this pin 10 is normally projected outwardly of the opening 11 through the medium of said leaf spring 9.

The outer end of this pin is tapered as at 12 in a direction from the right toward the left when we look at the tool from the handle end thereof for obviously allowing of the rotation of said tool in a direction toward the left. The turning of the tool in a direction toward the right when the same is extended within the bearing sleeve 6 in a manner as shown in Figure 1, will obviously center the pin 10 within the opening 7 of said bearing sleeve, whereupon a continued rotation of the tool in a direction toward the right, and a retraction of the same will draw said bearing sleeve from the rear axle of the vehicle.

Further, the forward edge of said pin 10 is also slightly tapered downwardly as at 13 for allowing the tool to be readily inserted within the bearing sleeve 6, it being obvious that this tapered portion upon engaging the front end of the sleeve 6 will allow said pin to be forced inwardly of the opening 11 in the tube 5 against the action of the spring 9, in order that the tube may be inserted entirely within the bearing sleeve 6.

In order to accurately position the tube within the bearing sleeve 6 so that a turning movement of the same in a right direction will engage the pin 10 within the opening of the sleeve, said tube 5 is provided at diametrically opposite points with screw threaded openings within which are disposed screw threaded set-screws 14—14 that are formed upon their outer ends with lugs 15 that engage the outer end of the bearing sleeve 6 for limiting the inward movement of the tube with respect to the sleeve, for a purpose above set forth.

From the foregoing it will be obvious that I have provided a highly novel, simple and efficient form of bearing sleeve remover, particularly adapted for removing the rear axle bearing sleeves of Ford automobiles, and even though I have herein shown and described the most practical embodiment of the invention with which I am at this time familiar, it is nevertheless to be understood that minor changes may be made in the invention without departing from the spirit and scope of the appended claims.

Having thus described my invention, what I claim as new and desire to secure by Letters Patent is:—

1. In a bearing sleeve remover of the character described wherein said bearing sleeve is provided with an opening intermediate its ends, a relatively elongated tubular member adapted to be engaged at one end within said bearing sleeve, a handle upon the opposite end of said member, means for limiting the movement of said tubular member within said bearing sleeve, and means carried by the inner end of said tubular member to automatically engage within the opening of said bearing sleeve when said tubular member has been positioned therein at the limit of its movement.

2. In a bearing sleeve remover of the character described wherein said bearing sleeve is formed with an opening, a relatively elongated hollow bar adapted to be inserted at one end within said bearing sleeve, a turning handle upon the outer end of said hollow bar, a leaf spring connected at one end within said hollow bar, a laterally outwardly extending pin carried by the front end of said leaf spring and adapted to be normally engaged through an opening in said hollow bar by the action of said spring, said pin adapted to automatically engage within the opening of said bearing sleeve upon the positioning of the said end of the hollow rod within said bearing sleeve, and upon a rotation of the same within the bearing sleeve, and means for limiting the inward extension of said end of the hollow rod within said bearing sleeve in order that said spring carried pin will be in direct line with the opening of the bearing sleeve during the operation of the tool.

3. In a bearing sleeve remover of the character described wherein said bearing sleeve is provided with an opening, a relatively elongated hollow rod, a turning handle upon one end of said rod, the other end of said rod adapted to be engaged within said bearing sleeve, a spring pressed pin carried by said hollow rod at the front end thereof and adapted to normally engage through an opening in the front end of said rod, said pin being beveled upon its upper end in a certain direction to allow of the free insertion of said hollow rod within the bearing sleeve, said pin being further beveled to allow a continuous rotation of the hollow rod in one direction within said bearing sleeve but preventing the rotation of said hollow rod in an opposite direction when said pin is brought into registration with the opening of the bearing sleeve, and means carried by said hollow rod at a distance from its front end equivalent to the distance between the opening of the bearing sleeve and its front end whereby the spring pressed pin will be brought into direct alinement with the opening of the sleeve when said hollow rod is inserted therein.

In testimony whereof I affix my signature.

ALBERT JOSEPH HEBERT.